US008396484B2

(12) United States Patent
Johnson et al.

(10) Patent No.: US 8,396,484 B2
(45) Date of Patent: Mar. 12, 2013

(54) METHODS AND APPARATUS FOR PROVIDING LOCATION DATA WITH VARIABLE VALIDITY AND QUALITY

(75) Inventors: Roderick Michael Johnson, Scottsdale, AZ (US); Brad Scheurman, Calgary (CA); Dane Blackwell, Calgary (CA); Ryan Scott Jones, San Diego, CA (US)

(73) Assignee: CorTxt, Inc., San Diego, CA (US)

( * ) Notice: Subject to any disclaimer, the term of this patent is extended or adjusted under 35 U.S.C. 154(b) by 564 days.

(21) Appl. No.: 12/192,975

(22) Filed: Aug. 15, 2008

(65) Prior Publication Data

US 2009/0061898 A1    Mar. 5, 2009

Related U.S. Application Data

(60) Provisional application No. 60/956,336, filed on Aug. 16, 2007, provisional application No. 61/027,358, filed on Feb. 8, 2008.

(51) Int. Cl.
*H04W 24/00* (2009.01)
(52) U.S. Cl. ............... 455/456.1; 455/456.2; 455/456.3; 455/456.4; 455/456.5; 455/456.6
(58) Field of Classification Search ............... 455/456.1, 455/456.2, 456.3, 456.4, 456.5, 456.6; 342/357.43, 342/357.42
See application file for complete search history.

(56) References Cited

U.S. PATENT DOCUMENTS

| 5,898,680 | A | | 4/1999 | Johnstone et al. |
| 5,982,324 | A | | 11/1999 | Watters et al. |
| 6,075,987 | A | * | 6/2000 | Camp et al. .................. 455/427 |
| 6,204,808 | B1 | * | 3/2001 | Bloebaum et al. ....... 342/357.42 |
| 6,222,483 | B1 | * | 4/2001 | Twitchell et al. ........ 342/357.42 |
| 6,556,942 | B1 | | 4/2003 | Smith et al. |
| 6,662,016 | B1 | | 12/2003 | Buckham et al. |
| 6,983,205 | B2 | | 1/2006 | Chen et al. |
| 7,158,080 | B2 | * | 1/2007 | van Diggelen .......... 342/357.42 |
| 2006/0155463 | A1 | | 7/2006 | Adachi |
| 2007/0273570 | A1 | | 11/2007 | Adachi |
| 2008/0262728 | A1 | * | 10/2008 | Lokshin et al. ............... 701/216 |
| 2009/0231189 | A1 | * | 9/2009 | Reddy et al. ............. 342/357.07 |
| 2009/0303118 | A1 | * | 12/2009 | Corazza et al. .......... 342/357.09 |

FOREIGN PATENT DOCUMENTS

| JP | 2005-003970 | 1/2005 |
| WO | WO98/26397 | 6/1998 |
| WO | WO 2007/054493 | 5/2007 |
| WO | WO2007/054493 | 5/2007 |
| WO | WO2009/026556 | 2/2009 |

OTHER PUBLICATIONS

Action and Response History in U.S. Appl. No. 12/197,128.
Int'l Search Report and Written Opinion in Application No. PCT/US2008/074093, dated May 18, 2009.
Int'l Preliminary Report on Patentability in Application No. PCT/US2008/074093, dated Feb. 24, 2010.
Int'l Search Report and Written Opinion in Application No. PCT/US2008/073399 dated Mar. 6, 2009.
Int'l Preliminary Report on Patentability in Application No. PCT/US2008/073399, dated Feb. 16, 2010.
Int'l Search Report and Written Opinion in Application No. PCT/US2008/073406, dated Feb. 17, 2009.
PCT International Search Report and Written Opinion from PCT/US2008/073406, Feb. 17, 2009.
PCT International Search Report and Written Opinion from PCT/US2008/073399, Mar. 6, 2009.

* cited by examiner

*Primary Examiner* — Kamran Afshar
*Assistant Examiner* — Shahriar Behnamian
(74) *Attorney, Agent, or Firm* — Fish & Richardson P.C.

(57) ABSTRACT

Methods, systems and computer program products for determining a location of a device based on location information are described. In some implementations, location assist information may be requested so as to determine a location of sufficient quality to satisfy a requesting application. Upon receiving the location assist information, empherides from one or more visible sources may be requested. The location assist information may be used to determine the location of the device until the device has received and decoded the empherides.

29 Claims, 6 Drawing Sheets

METHODS AND APPARATUS FOR PROVIDING LOCATION DATA WITH VARIABLE VALIDITY AND QUALITY

CROSS-REFERENCE TO RELATED APPLICATIONS

This application claims priority to U.S. Provisional Application Ser. No. 60/956,336 titled "Methods and Apparatus for Providing Location Data with Variable Validity and Quality," filed on Aug. 16, 2007, and U.S. Provisional Application Ser. No. titled "Methods and Apparatus for Providing Location Data with Variable Validity and Quality," filed on Feb. 8, 2008, the disclosure of which is incorporated herein by reference in its entirety.

TECHNICAL FIELD

The subject matter of this application is generally related to location-based systems.

BACKGROUND

Mobile Global Positioning System (GPS) applications and the underlying hardware solutions provide an end user the ability to work anywhere anytime, while providing a level of accuracy appropriate for Location Based Service (LBS) applications which actively require location information. For LBS applications, Time To First Fix (TTFF) is an important criterion for customer satisfaction and commercial adoption of LBS applications. For example, a consumer is likely to abandon a location based service request if the consumer has to wait for more than ten seconds to obtain satellite signals and navigation data.

When a GPS receiver is first turned on, or if the GPS receiver has not actively been receiving ephemeris information from GPS Satellites for an extended period, TTFF may take several minutes to achieve a fix, and in some instances, may not achieve a fix at all. To reduce the wait time, some LBS vendors use a control channel based protocol referred to as Radio Resource Location Protocol (RRLP), which can send the most current ephemeris File (e.g., 1667-byte four-hour-interval file) for a one time assist. Other LBS vendors also have created similar ephemeris files that provide Almanac-like data for 3 to 7 days into the future.

However, given the nature of the orbital and timing uncertainties, which often require the prediction of exactly where the active Pseudo Random Number (PRN) sources (i.e., satellites) will be with respective to their orbital positions above the earth (e.g., during each specific four-hour interval), the calculations as provided by these ephemeris files are generally not reliable.

SUMMARY

Methods, systems and computer program products for determining a location of a device based on location information are described.

In some implementations, a method includes receiving a request for location services, determining a locale associated with a requesting device, determining a set of visible triangulation sources, determining a subset of the visible triangulation sources that will provide a location fix at a predetermined accuracy, constructing a message that includes information required by the requesting device to locate the requesting device, and broadcasting the message.

In some implementations, a method includes requesting location assist information so as to determine a location of a device, receiving the location assist information including receiving a broadcast message that includes the location assist information, and constructing a location datafile including a minimal set of information required to locate the device and associated with only those triangulation sources that are visible during a time period associated with a service provided by the device.

In some implementations, a method includes receiving a request for location services from a requesting device, constructing a message that includes information required by the requesting device to locate the requesting device within a predetermined accuracy, the predetermined accuracy including a valid time period for use of location data where the valid time period is less than 4 hours, and delivering the message using a broadcast method.

In some implementations, a method includes determining a broadcast locale, determining a broadcast time, determining a broadcast interval, determining a time validity equivalent in accordance with the broadcast interval, determining a set of triangulation sources visible from within the broadcast locale during the broadcast interval, determining a subset of the visible sources that will provide a location fix at a predetermined accuracy, and constructing a message that includes information required by a listening device to assist a location service to locate the listening device.

In some implementations, a method includes determining a time to listen for a broadcast message including using a clock corrected time to activate listening, receiving a broadcast message at the time that includes triangulation source parameter data of a predetermined quality and accuracy, and using the broadcast message to assist in a determination of a location of a listening device.

In some implementations, a method includes requesting location assist information so as to determine a location of sufficient quality to satisfy a requesting application, receiving the location assist information, requesting empherides from one or more visible sources, and using the location assist information to determine a location of a device until the device has received and decoded the empherides.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

System Overview

Figure 1:
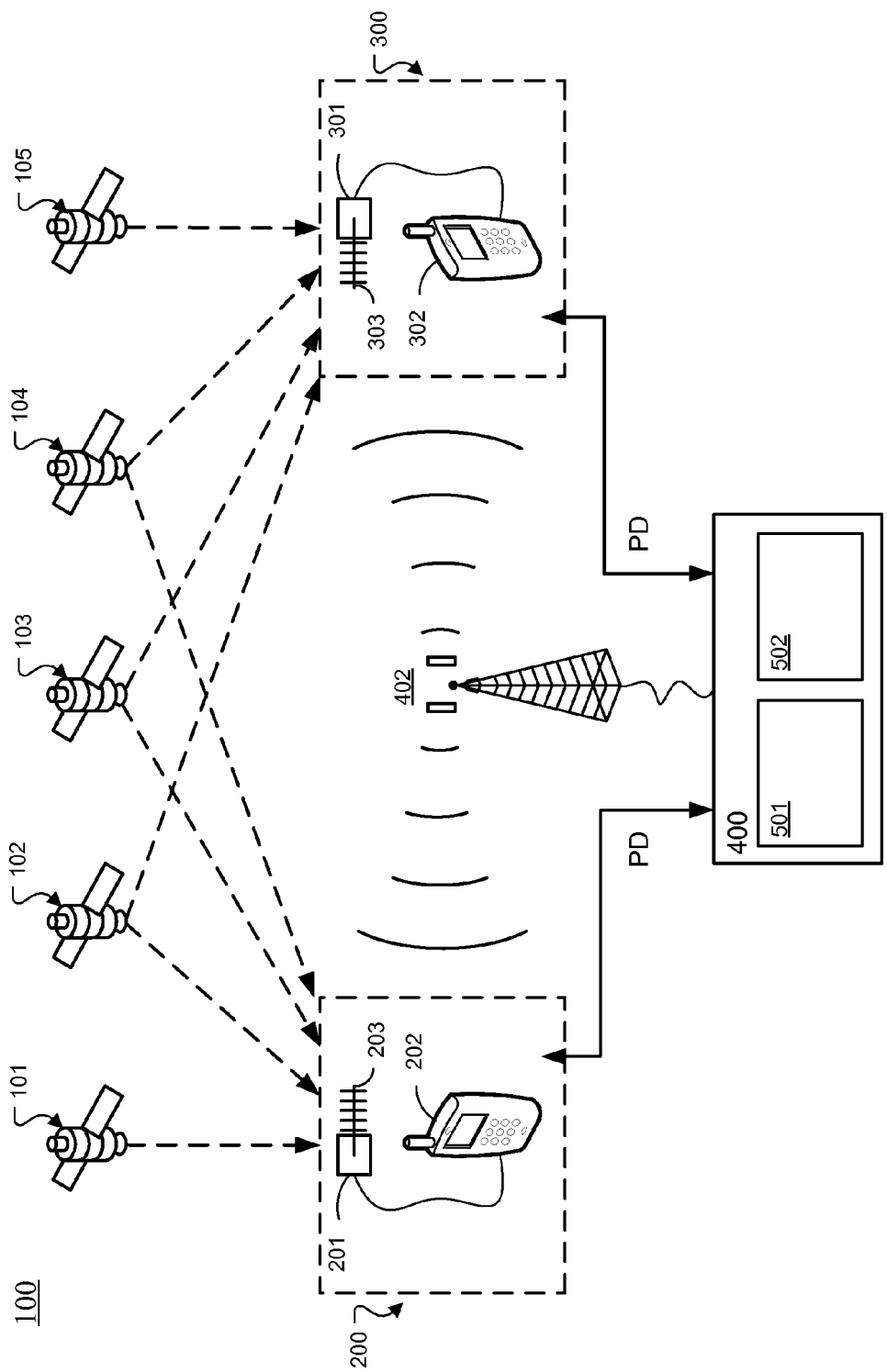
FIG. 1 shows a schematic view of an example GPS network.

FIG. 1 shows an illustrative network 100 with a base station 400, a mobile unit 200, a mobile unit 300, and communication device 402. Although only two mobile units are shown, there may be multiple mobile units. Also shown in FIG. 1 are satellites 101, 102, 103, 104, 105. Any one of the satellites may identify and provide the geographic position (i.e., location, altitude, and optionally a moving direction and/or moving speed) of the mobile units using the positioning information data PD.

As shown, the base station 400 generally includes a central processing unit 501, and at least one storage unit 502, and depending on the situation, may function as server or client. A communication device 402 of the base station 400 may include a connection connecting the base station 400 to a mobile wireless network, which can be used by a large number of mobile units. Connections to other wireless networks can also be implemented, (e.g., connections to deep-sea vessels or to mobile devices in areas where no mobile wireless networks are available). The base station 400 itself can be connected over the Internet, over direct data lines or over wireless networks to the telephone or data networks of one or multiple mobile wireless providers, so that the base station 400 can establish connections to mobile units in different telephone and/or other wireless networks. In some implementations, unidirectional, bi-directional or multidirectional connections or data exchange between the base station 400 and the mobile units 200/300 are possible.

In some implementations, the mobile units 200/300 may include mobile telephones 202/302 with at least one (internal or external) satellite positioning system receiver 201/301 (e.g., a GPS receiver), each with at least one corresponding antenna 203/303. While mobile telephones are described, the mobile units may be of other forms, for example navigation systems in vehicles, on ships or in aircraft. While the receiver 201/301 may receive GPS information, the receiver 201/301 also may transmit signals to the satellites 101-105, to another mobile unit(s) or base station 402. The antennas 203/303 may be any kind of antennas suitable for receiving signals transmitted by, for example, satellite positioning system satellites. The satellite positioning system receivers 201/301 and the antennas 203/303 may be suited to receive satellite signals transmitted by one or multiple satellites 101-105, which may be part of a satellite system (or multiple satellite systems) to determine a geographic location of a mobile unit (e.g., NAVSTAR-GPS satellites).

In some implementations, each satellite may operate with spread-spectrum technology. Specifically, each satellite may transport C/A code ("Coarse/Acquisition") for commercial use and a navigation message. The transmitted C/A code may be a pseudo-random, 1023 bit long code, which may be unique for every satellite. Due to this "pseudo-random noise" (PRN) these signals may be less susceptible to interference.

For the initialization of devices, almanac data may also be transmitted to a mobile unit. In some implementations, there may be 24 satellites in the GPS network 100, and each of the 24 satellites may send almanac data of other satellites. The almanac data may contain particular information about the ecliptic parameters of all satellites, their technical condition, identification numbers, and the like. From the almanac data, the receivers 201/301 may identify and/or deduce which satellites are likely to be in a line of sight, and so can limit associated geographic search only to the identified satellites.

The mobile units 200/300 may supply the base station 400 with information data set PD from one or multiple satellites 101-105. The mobile units 200/300 also may include a central processing unit to process and analyze the received data. The analyzed or processed data may then be stored again. The stored data—which may be raw data received in the form of satellite signals, or analyzed or processed data—may be read by the mobile units 200/300 from, for example, respective memory and made available to the base station 400 as information data PD.

In some implementations, information data PD may contain, for example, components of almanac data, ephemeris data or identification data for individual satellites from which signals have been received. Information data PD also may contain information about the geographical position of the satellite receiver 201/301 and its antenna 203/303, information about the reception quality of the satellite signals from individual satellites 101-105, or time references. In some implementations, a mobile unit that has received a navigation message can make any data included in the navigation message available within the scope of an information data PD. If desired, in certain implementations, only information in regard to individual satellites 101-105 may be made available.

The mobile units 200/300 may establish a connection to the base station 400 through its communication device 402, and send or exchange information data PD. Wireless-specific data protocols which may be used during information exchange include, without limitation, wireless application protocol (WAP), general packet radio service (GPRS), circuit switched data (CSD), high speed circuit switched data (HSCSD), SMS, UMTS, CDMA, WCDMA, or other standards. The mobile units 200/300 also may include WLAN or bluetooth units that enable the units to communicate via WLAN and/or bluetooth with a base station or other mobile units.

In the illustration shown in FIG. 1, the mobile unit 200 may receive signals from four of the five satellites 101-104, and the mobile unit 300 also may receive signals from four of the five satellites 102-105. As noted earlier, the GPS network 100 may include 24 satellites located on six orbits around the earth. A satellite receiver 201/301 with a good line of sight to the sky may receive on average signals from eight satellites.

Due to interference from buildings, weather conditions or the location itself, fewer satellites 101-105 may be visible and a mobile terminal 200/300 that generally receives signals from five satellites may only receive data from four satellites under such conditions. After receiving satellite data, the mobile units 200/300 may process the received satellite data and/or provide or communicate the satellite data in whole or in part unchanged as information data PD to the base station 400.

The mobile units 200/300, in some implementations, may analyze the received satellite data and determine their respective geographic location, and then supply or transmit the current ephemeredes of the individual satellites 101-105 and/or additional information, (e.g., the receiving time, receiving location and/or at least a part of the almanac data) as information data PD to the base station 400.

The base station 400, in some implementations, may recognize that the information data PD contains one or more satellite signals that have not been processed (e.g., in raw form) or that the data has already been processed by the respective mobile units 200/300. In some implementations, the base station 400 may detect and (further) process different formats of the received information data PD. Depending on the type of the unit, the information data PD can initially be stored unchanged and processed further at a later point in time, optionally depending on data received by other mobile units. In the same manner, the information data PD, after having been received, may immediately be analyzed, broken down into individual data components, and subsequently stored. For example, individual components (e.g., ecliptic data of individual satellites) may be stored, and optionally with data referring to the time when the information data was received, the location of the antenna 203/303 at the time when the satellite data were received, and/or other data.

In FIG. 1, the mobile units 200/300 may be supplied with positioning data (e.g., the ephemerid data) for the satellites 101-105, and in addition other positioning data (e.g., ephemerid data) from other satellites if already stored or available in the base station 400. If the mobile units 200/300 have already been notified which satellites 101-105 (e.g., satellites 102-104) are currently in its window of sight, then in conjunction with a request for positioning information data PD, the positioning information data PD may be limited to, for example, three satellites 102, 103, 104 that are located inside this window of sight. In addition or alternatively, at least a part of the almanac data regarding other satellites actually or potentially located in the field of sight may also be supplied or transmitted to the mobile units 200/300.

In some implementations, the mobile units 200/300 may be configured so that the base station 400 may notify an mobile unit if and under what conditions the mobile unit shall transmit the information data PD to the base station 400. Such notification may take place together or in conjunction with the provision of positioning data to another mobile unit.

Assist Through SMS Messages

In some implementations, GPS information may be delivered to a GPS assisted device through one or more messages (e.g., a SMS message). The one or more messages may be transmitted in a single or multiple transmissions. In some implementations, GPS information may include information necessary to enable the GPS assisted device to calculate a location of a predetermined accuracy (such as could be calculated using conventional methods). In some implementations, an assist service may be provided which can be operated through a central server by one or more mobile operators. A mobile operator may manage a NavServer (a GPS assist platform) in providing the assist service.

In some implementations, the mobile operator also may use an existing SMSC to send GPS assists or assist information in a form of a SMS message or multiple SMS messages rather than using out-of-band and in-band data channels or setting up other such ancillary data service connectivity via the MSC of the mobile operator. In some implementations, a single or multiple remotely located services (or similar services which provide SMS functionality to a mobile operator or operators) may be used to provide GPS assistance through one or more SMS interoperability services.

A number of assist services are already in operation which connect directly to mobile operators, and through associated service agreements with such operators, sending and receiving GPS assist information in the form of a SMS message to a mobile device is possible.

In some implementations, the GPS assist information may or may not include classic assist information. The classic assist information may include ephemeris data, and extended ephemeris data (which refer to the four or more hour validity of orbital descriptions of satellites and associated correction) information which provide nominal pseudorange correction. Such information is also referred to as "Ephemerides" in the U.S. Government idc200c GPS specification document. By definition, "Ephemerides" are terms used to describe "Keplerian orbital segments of 4 or more hours duration". In implementations in which classic assist information are not sent, ephemeris or Ephemerides information may be withheld. In some implementations, rather than sending ephemeris or Ephemerides information, time interval specific spatial coordinate information (herein after referred to as "assist information") of less than four hours in duration may be sent.

In some implementations, the assist information may be constructed in a manner that incorporates the precision correction information with a validity period equal to or greater than the spatial coordinate information. Further, the assist information may be provided that allows a GPS enabled device or an GPS assisted device to interpret Ephemerides or geographic location information so that accurate location may be generated.

Grade of Service

Most GPS applications use grade of service or quality of service requirements to determine the amount of and types of subscription services which may be provided to an individual or group of mobile subscribers. One example may include services delivery to contract or post-paid subscribers, as opposed to reduced services available to pre-paid subscribers. In location based services, there may be various service levels provided by a GPS system or other similar type of location service. The delivery of locations through a GPS system (e.g., system 100) may be a quick and efficient way to obtain accurate information associated with a geographic location.

However, there may be circumstances where the value to the user of the location information could be realized with less accurate information (e.g., the user may receive substantial value from information they receive some time in the future). For the purposes of services which are most interested in the general locale of a subscriber, it may be that the assist payload or location information strategy could be modified in a number of ways to be better suited for delivering less accurate information for these purposes. Conceptually, information accuracy and latency, or some combination of these attributes may be used to provide service levels which could have variable cost to the users. An example may include premium services tailored for customers who need or desire high accuracy and low latency.

In some implementations, within a broadcast subscriber service, first tier (e.g., paid) subscribers may receive and decode GPS assist information through navigation devices (e.g., which may vary in accuracy and latency dependent on the subscription service level purchased). Such devices may include, without limitation, in-car navigation devices, or personal navigation devices, and the like. In some implementations, these devices may not necessarily include an RF System such as GSM or CDMA to provide connectivity but rather a lower cost receiving module such as FM receivers or other similar broadcast devices.

Some users may be content with lower accuracy and/or higher latency service in exchange, for example, lower service cost. In this case, payloads of the assist information may be constructed to include parameters which may instruct a location client (GPS, WiFi assisted, or other Doppler or RSSI assisted location provision) to utilize resources in a manner appropriate for delivering the level of services required. Examples of cheaper location services may include services which provide non-GPS location information that may be less accurate than that provided by GPS location information (e.g., location information which can be interpreted actively or passively, such as the proximity to an RF source including a Wi-Fi access point, or 802.11 or Bluetooth device whose location may be known). In the foregoing example, the non-GPS location information may be passively available, or become available within a predetermined time period before an LBS service request is received or a response is required. Alternatively, grade of service may be a function of a user's economic rationale, where the service level appropriate for the user's economic capacity, such as Pre-paid customers or broadcast subscribers with reduced economic resources.

Another key consideration for grade of service beyond accuracy and latency may include the duration of service validity. Some LBS applications may use a single instantaneous location as a measure for service duration, whereas others may use turn-by-turn navigation or tracking, or other session-based methods to measure service duration. Thus, a user or a service provider may need to determine the length of session needed to support a service event. Under this circumstance, extensive GPS and network resources may be consumed. Fine tuning the assist information payload to support accurate location calculations for only the length of session being purchased may be desirable, after which the location client may disengage resource use. A longer session may include multiple locations, or providing an ability to determine locations over the time of validity of the session.

Session Validity, in a broadcast service implementation, may be determined by the length of time between assist message broadcasts or how often an assist message may be incorporated within a continuous broadcast. For example, an assist message may be broadcast at a frequency of once every five minutes, requiring an assist message of not less than five minutes validity to be constructed for each broadcast.

Visible Satellites During a Deterministic Time Period

In some implementations, ephemeris assist information, which may contain a data file that can be used by the GPS system 100 over a period of validity, and which may contain information associated with operational satellites in each ephemeris interval, predicted ephemeris interval or any number of subsequent predicted ephemeris intervals (collectively referred to as ephemeris assist), may be employed. The deterministic process may include placing information into the assist information for those satellites that may be used by an earthbound GPS receiver or assisted device, whose general geographic locale can be determined. In some implementations, a non-deterministic process also may be used.

As discussed previously, in a given general geographic locale, there may be 10 to 12 satellites which may be visible to a GPS receiver or assisted device during a particular time interval (e.g., minutes, hours or other time period up to four hours), effectively reducing the assist information payload by half. However, the number of visible satellites may be limited to those above the horizon, where typically eight or less may be visible out of the 24 active satellites in the constellation at the time of the assist request, no matter where the GPS system is located with respect to the constellation. In cases where an assist is only required for a deterministic period of time, such as a single immediate location, only those satellites in immediate view may be included in the assist information, which may result in a file that contains information associated with a maximum, for example, of 8 of 24 satellites, or that is one third the payload of a normal ephemeris assist.

Optimized Selection of Satellites Using Non-Deterministic and Deterministic Approaches A non-deterministic process may be used to determine a geographic location of an assisted GPS device (e.g., mobile units 200/300) by establishing assumptions about the general geographic locale of the assisted GPS device. Theoretically, a geographic locale may be of a scale as large as the continental USA, regions limited to those suitable for FM or other such type broadcast networks (e.g., with an effective range of 100 kilometers radius coverage), or regions surrounding a cell tower (e.g., base station 400) (e.g., with an effective coverage of 10 kilometers radius).

A geographic locale may be described by a location value stored in a database which may be used as the center of the general locale to be considered, along with a radius distance used to describe the diameter of a locale (e.g., a polygonal locale). In some implementations, a last known location of the GPS assisted device may be used to describe the locale, along with a radius of variable length to account for the possible movement of the GPS assisted device since the last known location.

When the GPS assisted device is connected to a mobile network, through which an assist request is being processed, the cell tower location may be used to provide a precise general locale. Alternatively, other non-deterministic means may be used by which a locale may be determined.

In some implementations, when a GPS assisted device is being assisted via a broadcast signal with a known broadcast area, the locale may be limited to the broadcast coverage of the broadcasting transmitter. The broadcast coverage may include a region which may be defined by a location that best approximates the center of the effective broadcast region and a radius that describes the extents of the region.

In some implementations, a deterministic approach may be used which utilizes a GPS receiver or assisted device to identify: (1) PRN values from visible satellites; (2) available pseudo ranges for those satellites which the GPS receiver or assisted device is able to communicate, capture and deliver this information to, for example, an imbedded local application, local software client or remote server application by any available means; or (3) only those satellites visible to the GPS receiver or assisted device, which may be the same or less than the number of satellites theoretically visible to the GPS receiver or assisted device using a non-deterministic method. For assists such as in a turn-by-turn application, known to take, as an example 1 hour in probable duration, the GPS network 100 may include satellites which may remain visible and viable over an assist period/session as well as those that are likely to become visible during the assist period/session. In some implementations, the overall length of an assist period/session may be of any length up to the limit of the availability of predicted information available at the time of the assist request.

Optimizing the Selection of Visible Satellites Using Expert System Guidelines

In some implementations, a GPS receiver or assisted device may use a software mask to prevent a GPS assisted device from using satellites that are less than (or greater than) a certain number of degrees above (or below) the horizon in calculating a geographic location. By doing so, the GPS receiver or assisted device may avoid an increase in ionospheric distortion, reduced signal strength and the likelihood of intermittent signal blocking in urban/suburban environments of those satellites closest to the horizon. In these implementations, sending ephemeris values associated with those satellites lower than the horizon the mask is set for would be meaningless. Accordingly, in some implementations, the GPS network 100 may be configured to adjust a satellite selection algorithm to remove satellites which will not, or are unlikely to be used in calculations due to the likelihood that such satellites are not good sources for calculating a geographic location.

In some implementations, the satellite selection algorithm may be adjusted to consider one or more classical rules (e.g., where eight satellites are available, the algorithm selects the best four satellites for use in determining location) along with other rules that take into consideration of the assist validity period and deterministic or non-deterministic known locale. In these implementations, one form of assist may require an assist request to provide specific information from a location client as to the specific location resources available at the time of the assist request (e.g., a GPS receiver, WiFi access point and/or network doppler and/or RSSI information which may be used to deterministically optimize the assist).

In some implementations, any number of unused network management packets, either on-band or off-band which are commonly and routinely sent between a network device and a mobile network, may be used to provide locale information. One example may include providing a vislist (e.g., a list of satellites visible to the GPS receiver or assisted device at or during a period of time). The vislist may include a four-byte packet that describes which satellites are visible at a given time. In this example, an invisible satellite may be represented in binary as "0" and a visible satellite may be represented in binary as "1". In this manner, the server application may select the best four, six, eight or more satellites that may provide the most appropriate assist for the required period of validity, with advance information that the GPS receiver or assisted device may use any combination of the selected satellites in calculating a geographic location.

In some implementations, a five-bit packet may be used to describe each visible satellite, as 0-31 possible permutations. This locale information may be made available to the location client or NavServer through any number of means. In some implementations, expert rules may be used to determine the best use of local resources on a GPS assisted device so as to optimize the overall local performance. For example, periscoping—where a GPS receiver or assisted device may be turned on independent of a location service request—may be used to determine locale information. When periscoping, the GPS assisted device may scan for satellites and/or ephemeris or almanac information, and build a vislist of satellites that allows the device to more efficiently and rapidly calculate a geographic location when the identification of the location is requested, after which the vislist may be updated on a regular basis (e.g., every few seconds, once every half hour or hour).

Unlike the power requirements for downloading ephemeris or almanac information, in some implementations, periscoping events may be limited to only gathering information (e.g., such as a vislist) which meet the quantity and quality consistent with the grade of services associated with a location client. In some implementations, periscoping may also be used to capture similar information from broadcast sources that may be known to broadcast such information at know times, where the efficiency of capturing such information is proportional to the size of the broadcast message being sent. This information may also be available passively, where other co-located GPS assisted devices, or other wireless devices such as Wi-Fi access points, 802.11 or Bluetooth devices that match up to the connectivity available to the GPS assisted device, have PRN or other such information available that may be used to more deterministically optimize the assists.

Integrating Harmonic Correction Factors

Kepler parameters may be defined for a four-hour window (e.g., 12 am, 4 am, 8 am, etc.). By including correction factors for ascension, inclination and radius of each PRN satellite orbit, small errors in an atypical Kepler orbit may be reduced to an acceptable level for the full four-hour validity of an ephemeris interval. These correction factors, in some implementations, may include: (1) amplitude of sine harmonic correction term to the orbit radius (e.g., in meters); (2) amplitude of cosine harmonic correction term to the orbit radius (e.g., in meters); (3) amplitude of cosine harmonic correction term to the argument of latitude (e.g., radians); (4) amplitude of sine harmonic correction term to the argument of latitude (e.g., radians); (5) amplitude of cosine harmonic correction term to the angle of inclination (e.g., radians); and (6) amplitude of sine harmonic correction term to the angle of inclination (e.g., radians).

Unlike conventional GPS systems which remove these factors to reduce the amount of data contained in the ephemeris interval file (which also results in a reduction of location accuracy), in some implementations, these correction factors may be incorporated into the assist information in order to maintain and improve location accuracy. For example, a new set of ephemeris parameters that are valid for a specific time may be calculated, where the calculation may use a forcing function that considers a particular time window within an interval. The new set of parameters for the time window may then take the correction factors into account while being generated. Angles and satellite coordinates may be computed for a specific time or range of time when incorporating the correction factors. Then, the calculation may be reversed without including the correction factors so that a new set of ephemeris parameters that are free of correction during the time window may be generated. During the time window, the resulting ephemeris predictions may provide improved accuracy, even though the foregoing six harmonic factors may no longer be contained in the ephemeris, as such ephemeris factors may be set to zero for the purposes of location calculations being determined by an assisted GPS receiver.

Method of Determining Nine Ephemeris Parameters Valid For a One Minute Window

Listed below are the standard calculations to get earth-fixed coordinates from fifteen ephemeris parameters which may include six correction factors as given by [1]:

$$n = \sqrt{\frac{\mu}{A^3}} + \Delta n$$

$$M_k = M_0 + nt_k$$

$$M_k = E_k - e\sin E_k$$

$$v = \tan^{-1}\left\{\frac{\sqrt{1-e^2}\sin E_k}{(\cos E_k - e)}\right\}$$

$$E_k = \cos^{-1}\left\{\frac{e + \cos v_k}{1 + e\cos v_k}\right\}$$

$$\phi_k = v_k + \omega$$

[1]

In some implementations, the harmonic corrections to argument of latitude (angle u), radius and inclination may be given by [2]:

$$\delta u_k = c_{us} \sin 2\phi_k + c_{uc} \cos 2\phi_k$$

$$\delta r_k c r_{rs} \sin 2\phi_k + c_{rc} \cos 2\phi_k$$

$$\delta i_k = c_{is} \sin 2\phi_k + c_{ic} \cos 2\phi_k \qquad [2]$$

where the corrected orbital positions for the argument of latitude may be given as [3]:

$$u_k = \phi_k + \delta u_k \qquad [3]$$

where the corrected orbital positions for the radius to satellite and inclination may be given as [4]:

$$r_k = A(1 - e \cos E_k) + \delta r_k \qquad [4]$$

and where the corrected orbital positions for the corrected inclination may be given as [5]:

$$i_k = i_o + \delta i_k + i_{dot} t_k \qquad [5]$$

In some implementations, the position in orbital plane may be given as [6]:

$$x'_k = r_k + \cos u_k$$

$$y'_k = r_k + \sin u_k$$

$$\Omega_k = \Omega_0 + (\Omega_{dot} - \Omega_{Edot}) t_k - \Omega_{Edot} t_{oe} \qquad [6]$$

such that the earth fixed coordinates of the satellite may be given as [7]:

$$x = x'_k \cos \Omega_k - y'_k \cos i_k \sin \Omega_k$$

$$y = x'_k \sin \Omega_k - y'_k \cos i_k \cos \Omega_k$$

$$z = y_k^i \cos \Omega_k \qquad [7]$$

Equations [1]-[7] may provide a function of time for determining the earth fixed coordinates of a satellite at any time $t_k$ seconds after an ephemeris interval (or epoch).

In some implementations, the ephemeris epochs may be four hours long beginning at 12:00 AM Sunday.

In some implementations, the terms in equations [1]-[7] may be sensitive to changes and cause large errors in the earth fixed coordinates x, y and z if omitted or modified. In some implementations, the six harmonic time correction factors may be omitted while at the same time achieving great accuracy over a one-minute period. This process may calculate a new set of ephemeris parameters that provides a satellite location for a specific time that substantially agrees with the satellite location calculated from the original ephemeris with harmonic correction factors. Generally, the process may be summarized as the following eleven steps:

Step 1) In step 1, a new $T_{oe}$ may be defined and the variable $t_k$ may be set to a number of seconds from the original four hour $T_{oe}$ to a new one.

Step 2) In step 2, an initial sample of coordinates and angles may be obtained by using the new $t_k$ for equations [1]-[7].

Step 3) In step 3, the variable $t_k$ may be incremented by sixty seconds and the equations [1]-[7] may be analyzed again to obtain a second sample of coordinates and angles.

Step 4) In step 4, a new initial Omega value (longitude of ascending node) from the original Omega value may be determined using [8]:

$$\Omega'_0 = \Omega_0 + (\Omega_{dot} - \Omega_{Edot}) t_k - \Omega_{Edot} t_{oe}$$

$$\Omega'_1 = \Omega_0 + (\Omega_{dot} - \Omega_{Edot})(t_k + 60) - \Omega_{Edot} t_{oe}$$

$$\Omega_{dot} = (\Omega'_1 - \Omega'_0)/60 \qquad [8]$$

where the variable $t_k$ is the time from the old $T_{oe}$ to the new $T_{oe}$. Equation [8] also determines the Omega (after sixty seconds) and then subtract the determined Omega from the initial Omega to obtain the new Omega value $\Omega_{dot}$ (e.g., unchanged from the original).

Step 5) In step 5, a new initial inclination value and rate of inclination (i dot) may be determined from equations [9]-[10]:

$$i'_0 = i_0 + \delta i_{k0} + i_{dot} t_k \qquad [9]$$

where the new initial inclination as provided by equation [9] may include the correction factor built in; and where equation [10] is given by:

$$i'_1 = i_0 + \delta i_{k1} + i_{dot}(t_k + 60) \qquad [10]$$

The inclination after sixty seconds may have a new correction value as shown in step 3, as is given by [11]:

$$i'_{dot} = (i'_1 - i'_0)/60 \qquad [11]$$

In these implementations, the new $i_{dot}$ may be different than the original $i_{dot}$ because the inclination correction factors may be included.

Step 6) In step 6, the new corrected values may be used for radius for the new $T'_{oe}$ and $T'_{oe}$ after 60 seconds, and a new eccentricity and ellipse major-axis (A) may be calculated to absorb the harmonic radius correction factor, as are given by [12] and [13]:

$$r_0 = A(1 - e \cos E_0) + \delta r_{k0} \qquad [12]$$

$$r_1 = A(1 - e \cos E_1) + \delta r_{k1} \qquad [13]$$

$E_0$ and $E_1$ may be the eccentric anomalies that have been calculated for the new $T'_{oe}$ and $T'_{oe}$ after 60 seconds respectively. In some implementations, the above equations may become a function of time (e.g., a function of $E_k$) by substituting the expression [14]:

$$M_k = E_k - e \sin E_k \text{ for } E_k \qquad [14]$$

where $M_k = M_0 + nt_k$ and where $$n = \sqrt{\frac{\mu}{A^3}} + \Delta n.$$

If $E_k$ is known, then A may be eliminated so as to obtain equation [15]:

$$\frac{r_0}{(1 - e \cos E_0)} = \frac{r_1}{(1 - e \cos E_1)} \qquad [15]$$

or $$r_0 - r_0 e \cos E_1 = r_1 - r_1 e \cos E_0$$

which yields equation [16]:

$$e = \frac{r_1 - r_0}{(r_1 \cos E_0 - r_0 \cos E_1)} \quad [16]$$

From equation [16], the calculated radiuses and "E" angles may be inserted to obtain a new eccentricity value. In this case, the new major axis length A also may be obtained by using equation [17]:

$$r_0 = A(1 - e \cos E_0) \quad [17]$$

which becomes [18]:

$$A = \frac{r_0}{(1 - e \cos E_0)} \quad [18]$$

Step 7) The relationship between the eccentric anomaly (angle "E") and true anomaly (angle "v") may be used to obtain angle "v" and its correction to agree with the calculated angle "u", as may be given be [19]:

$$v_0 = \tan^{-1}\left\{\frac{\sqrt{1-e^2}\sin E_0}{(\cos E_0 - e)}\right\} \quad [19]$$

The true anomaly that is calculated in step 7 may be different than the originally calculated true anomaly provided in step 2 because a new eccentricity is being used in step 7. Step 7 also reconciles the different value of $v_0$ with the actual angle $u_0$ calculated for the new $T'_{oe}$, as is given by [20]:

$$u_0 = v_0 + \omega + \delta uhd\, k \quad [20]$$

where ω is an ephemeris parameter called the argument of perigee, or omega. In some implementations, since the correction factor $\delta u_k$ is being eliminated, the correction factor $\delta u_k$ is set to zero. In these implementations, a new value of ω may be included to compensate for the loss of the correction factor $\delta u_k$ and force the correct value of $u_0$ at $t = T'_{oe}$.

Step 8) In step 8, a new mean anomaly from the eccentric anomaly may be determined using the new eccentricity. Because the Keplers equation may be given by $M_o = E_o - e \sin E_0$, the new Mean Anomaly $M_0$ at the new $T'_{oe}$ may be solved.

Step 9) In step 9, a new Δn may be determined to provide a new orbital speed correction. The new Δn (delta N) may be the final ephemeris parameter to create. In some implementations, the new delta N may be used to provide the rate of change of the mean anomaly, as is given by [21]:

$$M_k = M_0 + n t_k \quad [21]$$

where $$n = \sqrt{\frac{\mu}{A^3}} + \Delta n$$

The existing parameters may have already been adjusted so that the radius is correct at $T'_{oe}$ and $T'_{oe}+60$ seconds, and so that the angle "u" is correct at $T'_{oe}$. In some implementations, a suitable Δn may be selected so that the mean anomaly $M_k$ may have a value at time $T'_{oe}+60$ seconds that forces the angle "u" to have a correct value. An algorithm using an iterative approach may be used to select this value of Δn that considers the complex (non-linear) relationship between the mean anomaly M and the angle "u".

Step 10) In step 10, the new parameters may be adjusted to move the $T'_{oe}$ back to the original $T_{oe}$. To be usable by the GPS network 100, the $T_{oe}$ may be on a four-hour interval. This will rewind the initial values of $M_0$, $i_0$ and $\Omega_0$ so that at $T'_{oe} = T_{oe} + t_k$ the ephemeris becomes accurate.

In some implementations, $M'_0$, $i'_0$ and $\Omega'_0$ may be the values that have been calculated for $T'_{oe}$, as are given by [22]:

$$\Omega_0 = \Omega'_0 - \Omega_{dot} t_k \quad [22]$$
$$i_0 = i'_0 - i_{dot} t_k$$
$$M_0 = M^i_0 - \left(\sqrt{\frac{\mu}{A^3}} + \Delta n\right) t_k$$

Step 11) In step 11, on the Device End, the new ephemeris parameters may be used to form an ephemeris file which may be presented to the GPS network 100 as the currently valid ephemeris.

Figure 2:
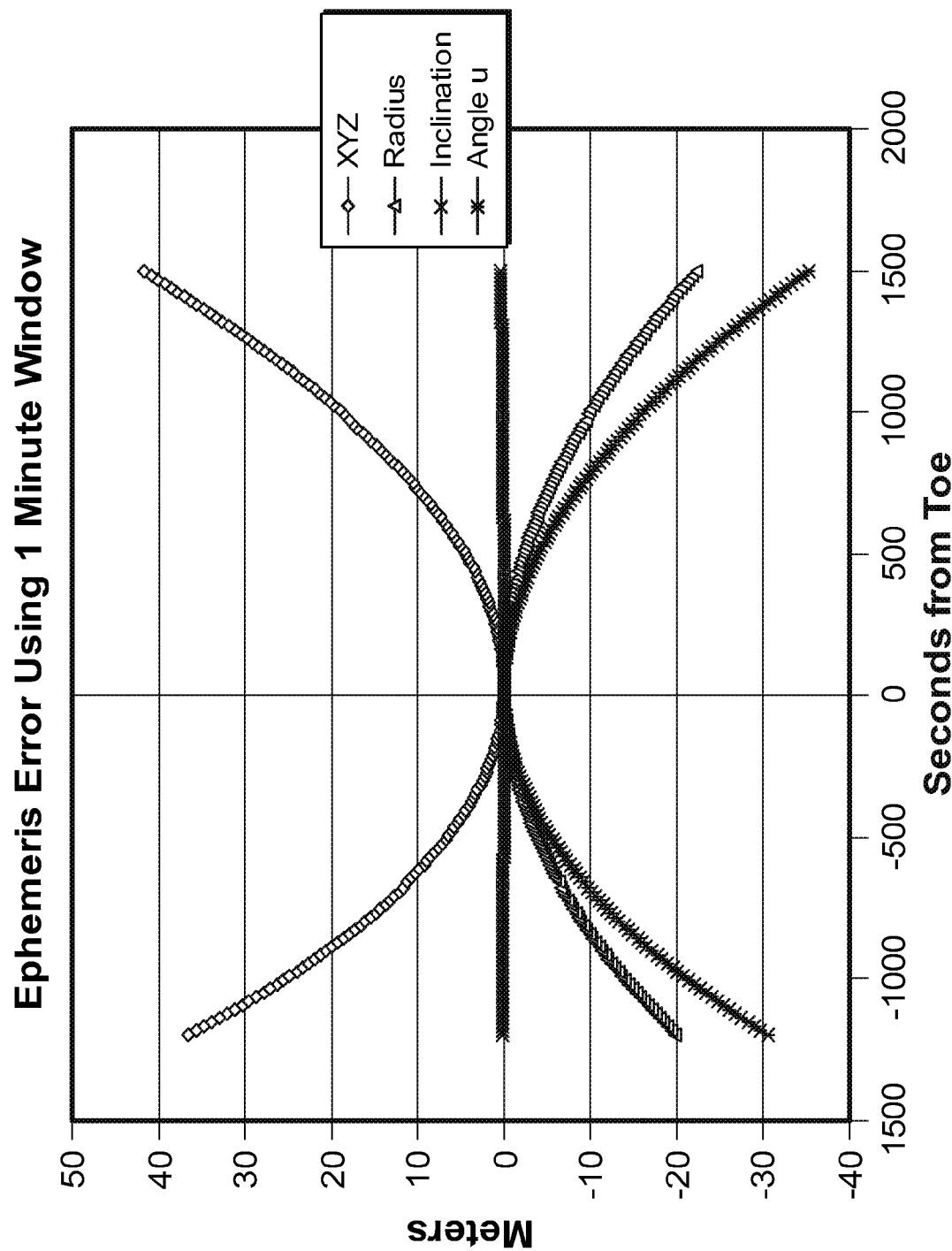
FIG. 2 shows an example error associated with a reference time in the xyz coordinate, radius, radius*inclination and radius*uk.

The foregoing eleven steps may produce nine new ephemeris parameters that can be used without correction factors to give a precise satellite prediction for a new reference time ($T'_{oe}$) and for a period of 60 seconds after the reference time. These parameters may provide location accuracy for all times in between (e.g., centimeter accuracy compared to the original "xyz" coordinate). In some implementations, the error may increase parabolically outside of this interval because the error of both radius and angle "u" may increase parabolically. The apex of the parabola may be quite shallow and may center at 30 seconds (the middle of the validity time selected) from $T'_{oe}$, thus keeping the error at its minimum. FIG. 2 shows an example of such an error in the xyz coordinate, radius, radius*inclination and radius*$u_k$.

Geometric Significance

In some implementations, the foregoing steps may slightly change the shape and speed of the satellite orbit so that the corrected and uncorrected orbits coincide for a window of time (e.g., for 2 points in time). The new orbit may be a perfect ellipse with a slightly different size and eccentricity that overlaps the original corrected orbit slightly. In some implementations, the original corrected orbit may not be a perfect ellipse, but have small perturbations.

Packet Structure

Table 1 shows an example listing of the ephemeris parameters that may be sent for each satellite-in-use:

TABLE 1

| Sym | Name | Size | Scaling | Description |
|---|---|---|---|---|
| $\Delta n$ | Delta N | 8 bits | $N = \Delta n * 2^{35}/\pi$ | mean motion difference from computed value |
| $M_o$ | M0 | 32 bits | $N = M_o \times 2^{31}/\pi$ | mean anomaly at reference time |
| E | Eccen | 27 bits | $N = e \times 2^{33}$ | Eccentricity |
| $\sqrt{A}$ | A_Sqrt | 18 bits | $N = \sqrt{A} \times 2^{19} - 2702000000$ | square root of the semi-major axis |
| $\Omega_0$ | Omega 0 | 32 bits | $N = \Omega_o \times 2^{31}/\pi$ | longitude of ascending node of orbit plane at weekly epoch |
| $i_0$ | AngIncl | 27 bits | $N = i_o \times 2^{31}/\pi - 600000000$ | Inclination angle at reference time (600000000-700000000) |
| $\omega$ | Omega | 32 bits | $N = \omega \times 2^{31}/\pi$ | longitude of ascending node |
| $\Omega_{dot}$ | Omega Dot | 14 bits | $N = \Omega_{dot} \times 2^{43}/\pi + 20000$ | rate of right ascension (-20000--28000) |
| $i_{dot}$ | IDOT | 12 bits | $N = i_{dot} \times 2^{43}/\pi$ | rate of inclination angle |
| $T_{GD}$ | T_GD | 8 bits | $N = T_{GD} \times 2^{31}$ | L1 and L2 correction term to account for Group delay differential |
| $\alpha_0$ | AF0 | 22 bits | $N = \alpha_0 \times 2^{31}$ | polynomial clock correction coefficient (clock bias) |

In some implementations, the entire set of nine ephemeris parameters plus two clock correction parameters may be packed into 232 bits (29 bytes) per satellite. For each parameter, a conversion may be listed which converts the floating point values to integer values. In some implementations where a parameter always falls into a narrow range (such as the inclination angle), the bits may be reduced to add an offset to the integer amount. With the inclination angle, the integer value may be between 40200000 (or 600000000) to 700000000, so by subtracting 40200000 (or 600000000), the value may be sent in 27 bits because that allows a range of 40200000 (or 600000000)-7342177238.

In some implementations, the parameter $\Delta n$ (Delta N) may be sent with less precision than usual (8 bits instead of 16 bits) without affecting the overall accuracy. An iterative process may calculate the value needed to set the angle "u" at the minimum possible error between $T'_{oe}$ and $T'_{oe}+60$ seconds. The overall correction for accuracy needed may then be estimated to within two decimal places, requiring only 8 bits.

Clock Correction

In some implementations, the satellite ephemeris may provide a clock correction which accounts for the bias and the drift of the atomic clock and also for L1-L2 group delay bias and differential. In some implementations, the satellite clock correction may be given by [23]:

$$\Delta t = \alpha_0 + \alpha_1 \Delta t + \alpha_2 \Delta t^2 \quad [23]$$

where parameters $a_1$, and $a_2$ may provide the drift over time.

In equation [23], the value of $a_1$ may be in a range of $+/-2.4 \times 10^{-11}$ sec/sec. This means that the clock may drift by a few trillionths of a second. When $\Delta t$ is in the range of 0-60 seconds, the maximum clock drift that can occur may be about $1.3 \times 10^{-9}$ seconds (or about a nanosecond). This drift is thus much less than the random uncertainty in the clock time and only enough to cause a range error of 0.4 meters after one minute in the worst case of a clock with a high drift.

In some implementations, to save space, the clock drift $a_1$ and $a_2$ may not be sent as they may have very little effect within the narrow time range. However, the parameter $a_0$ may be corrected for clock drift before being sent. In some implementations, the parameter $a_0$ may be corrected by adding $\alpha_1(t-t_{oc})+\alpha_2(t-t_{oc})^2$ where t may be the beginning of a time window of validity. In some implementations, the clock may be corrected to be accurate at the beginning of the time window and assumed not to drift significantly during the one minute time window.

In some implementations, it may be necessary to include the value of $T_{GD}$ for the ephemeris file. This may provide a correction factor for the L1 and L2 group delay. This time correction, however, may not be simply added to the parameter $a_0$ because it may be used differently depending on whether the L1 group delay or the L2 group delay is being corrected. If L1 group delay is always being used, then $T_{GD}$ may be subtracted from the parameter $a_0$ instead of sending $T_{GD}$ which may save a byte of space.

Clock Correction from A GPS Ground Station

In some implementations, when a valid clock correction from a current reading from an AGPS ground station may be obtained, a time correction may be added to the parameter $\alpha_0$ before being sent. This time correction may be determined from measuring the discrepancy between the expected correction in the signal travel time and the observed correction that the ground station is able to make by knowing its own exact location, for example, at all times. The discrepancy may be due to local changes in the atmosphere near the ground station which affect, for example, the speed of light in the area. This extra correction to the parameter $a_0$ may be available by obtaining the latest correction over the internet for the ground station nearest the GPS receiver or assisted device.

Clock Correction for Broadcast Messages

In some implementations, a clock correction for a broadcasted assist message may require time corrections that may be unique for each broadcasting source. In some implementations, one clock correction may have a listening device within each broadcast region with access to accurate GPS time. The system may calculate the offset between local broadcast time and the GPS time, and incorporate this clock correction as part of the broadcast assist message.

Packet Header

In some implementations, in addition to the above data for each satellite, some individual values may be required once for all satellites. In some implementations, these will be in the header of a packet and may be used when reconstructing an ephemeris file at the GPS assisted device. In some implementations, the header may include the following information:

Command Code (1 byte) which identifies the packet as being an ephemeris assist packet as opposed to some other type of data packet;

PRN Mask (4 bytes) which may be a 32-bit bitmask where each bit indicates whether the corresponding satellite (PRN) is included in the file. For example, the first bit may indicate whether PRN 1 is included;

TOC (Clock data reference time) (1 byte) which provides the reference time at the start of a four-hour interval in the ephemeris file. The reference time may be given in seconds and may be in the range of 0 to 604,800 seconds. There are 14,402 seconds in a four-hour interval, thus TOC can be expressed in 14402-second increments. The midpoint of the first interval is 7200 seconds so that the TOC may be scaled down to 8 bits (1 byte) by sending N=(TOC−7200)/14402;

Interval number (1 byte) which identifies which of the four-hour interval of the day is being referenced by the packet;

Ionospheric segment (8 bytes) which may be the final part of the ephemeris file read by the GPS receiver or assisted device. The segment may include an 8-byte ionospheric segment. The segment from the original ephemeris file may be added as-is to the packet header so that the segment can be used in creating the new file; and CRC (2 bytes) which may be appended to the end of the packet as an error detection/correction identification.

Decompressing the Packet

In some implementations, the packet may be decompressed at the device and used to form a standard shaped 1-day ephemeris file to be used by the GPS receiver or assisted device. In some implementations, the ephemeris file may only be accurate for the time of validity used to construct the file. In some implementations, the header of this new ephemeris file may be constructed at the GPS assisted device according to TABLE 2:

TABLE 2

| Format | Parameter | Description | Values/Units |
|---|---|---|---|
| BIT4 | Generation Method | | Range (0 . . . 15) Valid value: 1 |
| BIT4 | Compaction Method | | Range (0 . . . 15) Valid value: 1 |
| BIT4 | Post Compaction Method | | Range (0 . . . 15) Valid value: 1 |
| BIT4 | Compression Method | | Range (0 . . . 15) Valid value: 0 |
| BIT4 | Encryption method | | Range (0 . . . 15) Valid value: 0 |
| BIT4 | Prediction interval. | | Range (0 . . . 7) Valid value: 1 |
| UINT16 | GPS Week Number | 10 bit GPS week number This field indicates the week number of the first day when the predication is valid. | |
| UINT8 | GPS Day of Week | Sunday is day 0 This field indicates the day number of the first day when the predication is valid. | Range (0 . . . 6) |

TABLE 2-continued

| Format | Parameter | Description | Values/Units |
|---|---|---|---|
| UINT16 | GMT - Year | This field is part of the GMT time stamp which indicates the time when the file is generated. This field represents the year field. | |
| UINT8 | GMT - Month | This field is part of the GMT time stamp which indicates the time when the file is generated. This field represents the month field. | |
| UINT8 | GMT - Date | This field is part of the GMT time stamp which indicates the time when the file is generated. This field represents the day field. | |
| UINT32 | GMT - Second in Day | This field is part of the GMT time stamp which indicates the time when the file is generated. This field represents the second of the day field. | |
| UINT16 | Reserved | | |
| UINT16 | TBD | | |
| UINT32 | TBD | | |
| UINT16 | Additional_Checksum | Simple checksum of the ionospheric words at the end of the file (one word is 16-bit). | |
| UINT16 | Checksum | Simple checksum of the header (XOR of all header words except "Checksum", one word is 16-bit). | |

The values for the fields listed under TABLE 2 may be either hard-code as given, filled in from the clock, or the result of checksum operations.

The next part of the ephemeris file may be a block of data for each of the possible 32 satellites. Satellites that are not included in the packet may be set to a block of zeroes. For each satellite that is included, there may be one interval that may contain data while the other five intervals of the day may be written as a block of zeroes.

For the one valid interval for the included satellites, the ephemeris parameters may be extracted from the packet by taking the integer value of the parameter and subtracting any offset that was used in the packet structure table. For example, $i_0$ may be a 27 bit number that uses an offset of −40200000 (or 600000000), so that 40200000 (600000000) may be added before being inserted as a 32-bit value in the new ephemeris file. In addition, the values of cuc, cus, crc, crs, cic, crs, $a_1$ and $a_2$ may be set to zero. The value of TOC for that interval may be set to the single value of TOC given in the packet header for all included satellites. Finally, the value of URA IND may be set to 129 for all included satellites. After the 32 blocks of satellite data, the 8 bytes of the ionospheric segment given in the packet header may be added.

Example Processes

Figure 3:
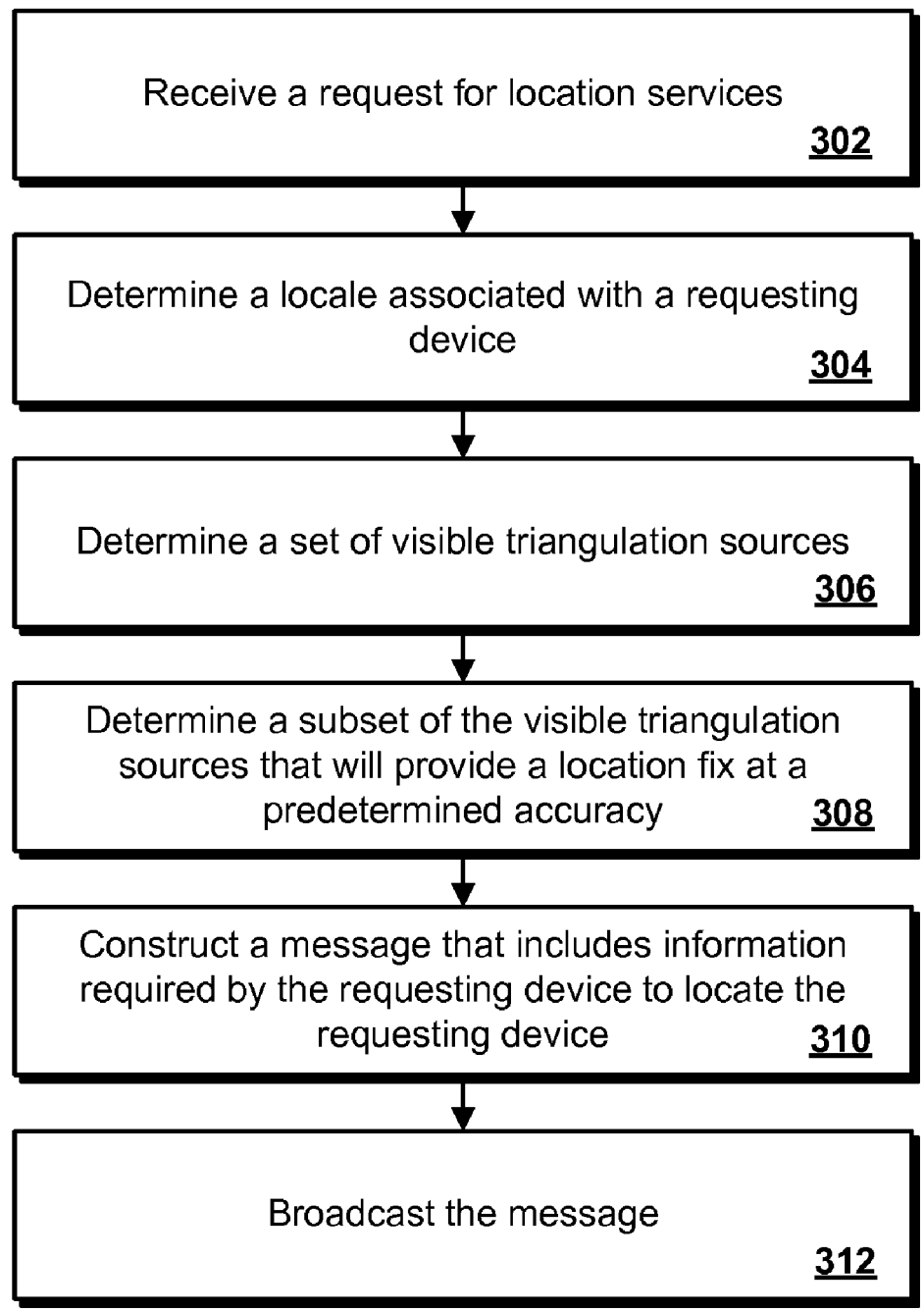
FIG. 3 is a flow diagram showing an example process for constructing a message that includes information required by a GPS assisted device to locate the device.

FIG. 3 is a flow diagram showing an example process for constructing a message that includes, for example GPS information required by a GPS assisted device to locate the device. The process 300 may be performed, for example, by the GPS network 100, and for clarity of presentation, the description that follows uses the GPS network 100 as the basis of examples for describing the process 300. However, another apparatus, system, or combination of systems, may be used to perform the process 300.

Process 300 begins with receiving a request for location services (302). In some implementations, the request may be transmitted by a mobile unit 200/300 in a GPS network 100. In some implementations, the request may be received by one or more satellites. The one or more satellites may include one or more satellites visible to the device transmitting the request. In some implementations, the one or more satellites may include satellites visible to the device for which location information is requested. In some implementations, the one or more satellites may be limited to only those above the horizon.

After receiving the request, a locale associated with a requesting device may be determined (304). In some implementations, the requesting device may be the same device transmitting the request. In other implementations, the requesting device may be different from the device that transmits the request. The requesting device may include, without limitation, a mobile telephone, a PDA, in-car navigation device, personal navigation device, and the like.

In some implementations, the locale may include a scale of the entire continental USA, with an effective range of 100 kilometers radius coverage (e.g., those that are suited for FM and similar broadcast networks), or with an effective coverage of 10 kilometers radius (e.g., those surrounding a cell tower).

The locale may be described by a location value stored in a database which may be used as the center of the general locale to be considered, along with a radius distance used to describe the diameter of a locale (e.g., a polygonal locale). In some implementations, a last known location of the requesting device may be used to determine the locale, along with a radius of variable length to account for the possible movement of the device since the last known location.

In some implementations, if the requesting device is connected to a mobile network, through which an assist request is being processed, the location of the cell tower associated with the requesting device may be used to determine the locale. Alternatively, other non-deterministic means may be used by which a locale may be determined.

In some implementations, when the requesting device is being assisted via a broadcast signal with a known broadcast area, the locale may be limited to the broadcast coverage of the broadcast area. In these implementations, the broadcast coverage may include a region that best approximates the center of the effective broadcast region and a radius that describes the extents of the region.

From the locale, a set of visible triangulation sources (306) and a subset of the visible triangulation sources that will provide a location fix at a predetermined accuracy (308) may be determined. In some implementations, a set of ephemeris parameters that are valid for a specific time may be calculated. The set of parameters for the specific time window may then take one or more correction factors into account while being generated.

In some implementations, the one or more correction factors for ascension, inclination and radius of each satellite (e.g., satellites visible to the requesting device) may be considered in providing the predetermined accuracy. These correction factors, in some implementations, may include: amplitude of sine harmonic correction term to the orbit radius; amplitude of cosine harmonic correction term to the orbit radius; amplitude of cosine harmonic correction term to the argument of latitude; amplitude of sine harmonic correction term to the argument of latitude; amplitude of cosine harmonic correction term to the angle of inclination; and amplitude of sine harmonic correction term to the angle of inclination.

Angles and satellite coordinates may be computed for a specific time or range of time when incorporating the one or more correction factors. Then, the calculation may be reversed without including the correction factors so that a new set of ephemeris parameters that are free of correction during the time window may be generated. During the time window, the resulting ephemeris predictions may provide improved accuracy, even though the one or more correction factors may no longer be contained in the ephemeris, as such ephemeris factors may be set to zero for the purposes of location calculations being determined by an assisted GPS receiver.

With the set and subset of visible triangulation sources determined, a message may be constructed that includes information required by the requesting device to locate the requesting device (310). In some implementations, the message may be a SMS message. The SMS message may be transmitted in a single transmission. If multiple SMS messages are involved, the message may be transmitted in multiple transmissions. After constructing the message, the message may be broadcast (312). In some implementations, the message may be broadcast back to the requesting device. If the requesting device is different from the device transmitting the request for location services, then the message also may be broadcast to the device transmitting the request for location services.

In some implementations, operations 302-312 may be performed in the order listed, in parallel (e.g., by the same or a different process, substantially or otherwise non-serially), or in reverse order to achieve the same result. In another implementations, operations 302-312 may be performed out of the order shown. For example, a set of visible triangulation sources may be determined (306) prior to determining a locale associated with a requesting device (304). As another example, a locale associated with a requesting device may be determined (304) prior to receiving a request for location services. Also, the order in which the operations are performed may depend, at least in part, on what entity performs the method. Operations 302-312 further may be performed by the same or different entities or systems.

Figure 4:
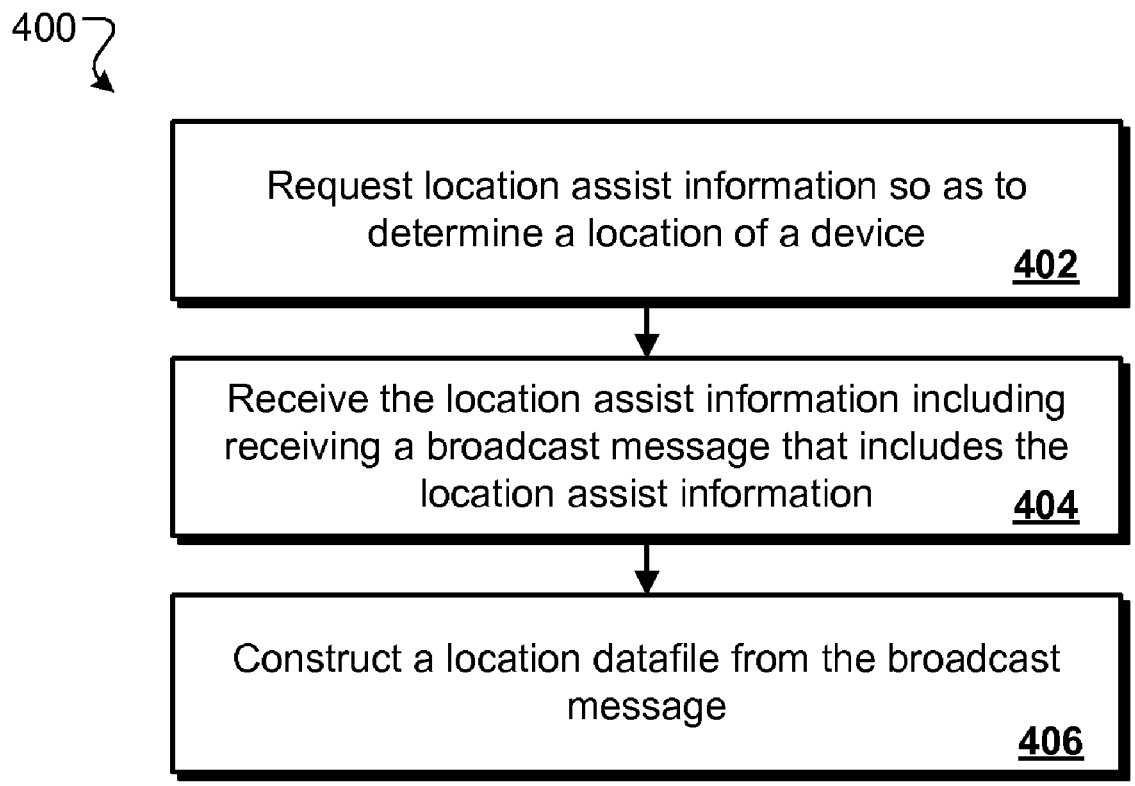
FIG. 4 is a flow diagram showing an example process for constructing a location datafile.

FIG. 4 is a flow diagram showing an example process for constructing a location datafile. Similar to FIG. 3, process 400 may be performed, for example, by the GPS network 100, and for clarity of presentation, the description that follows uses the GPS network 100 as the basis of examples for describing the process 400. However, another apparatus, system, or combination of systems, may be used to perform the process 400.

Process 400 beings with requesting location assist information so as to determine a location of a device (402). In some implementations, the request may be transmitted by a mobile unit 200/300 in a GPS network 100. In these implementations, the request may be received by one or more satellites.

The one or more satellites may include one or more satellites visible to the device transmitting the request. In some implementations, the one or more satellites may include satellites visible to the device for which location information is requested. In some implementations, the one or more satellites may be limited to only those above the horizon.

In response to the request, location assist information may be received that includes a broadcast message containing the location assist information (404). In some implementations, the broadcast message may be a SMS message. The SMS message may be transmitted in a single transmission. If multiple SMS messages are involved, the message may be transmitted in multiple transmissions.

A location datafile may subsequently be constructed (406). In some implementations, the datafile may include a minimal set of information required to locate the device. The minimal set of information may be associated with only those triangulation sources that are visible to the device during a time period associated with a service provided by the device.

In some implementations, a vislist (e.g., a list of satellites visible to the GPS receiver or assisted device at or during a period of time) may be used to determine the triangulation sources that are visible to the device. The vislist may include, for example, a four-byte packet that describes which satellites are visible at any given time. For example, an invisible satellite may be represented as binary "0" while a visible satellite may be represented as binary "1". The vislist allows the device to more efficiently and rapidly determine a geographic location when the identification of the location is requested, after which the vislist may be updated on a regular basis (e.g., every few seconds, once every half hour or hour).

In some implementations, operations 402-406 may be performed in the order listed, in parallel (e.g., by the same or a different process, substantially or otherwise non-serially), or in reverse order to achieve the same result. In some implementations, operations 402-406 may be performed out of the order shown. Also, the order in which the operations are performed may depend, at least in part, on what entity performs the method. Operations 402-406 further may be performed by the same or different entities or systems.

Figure 5:
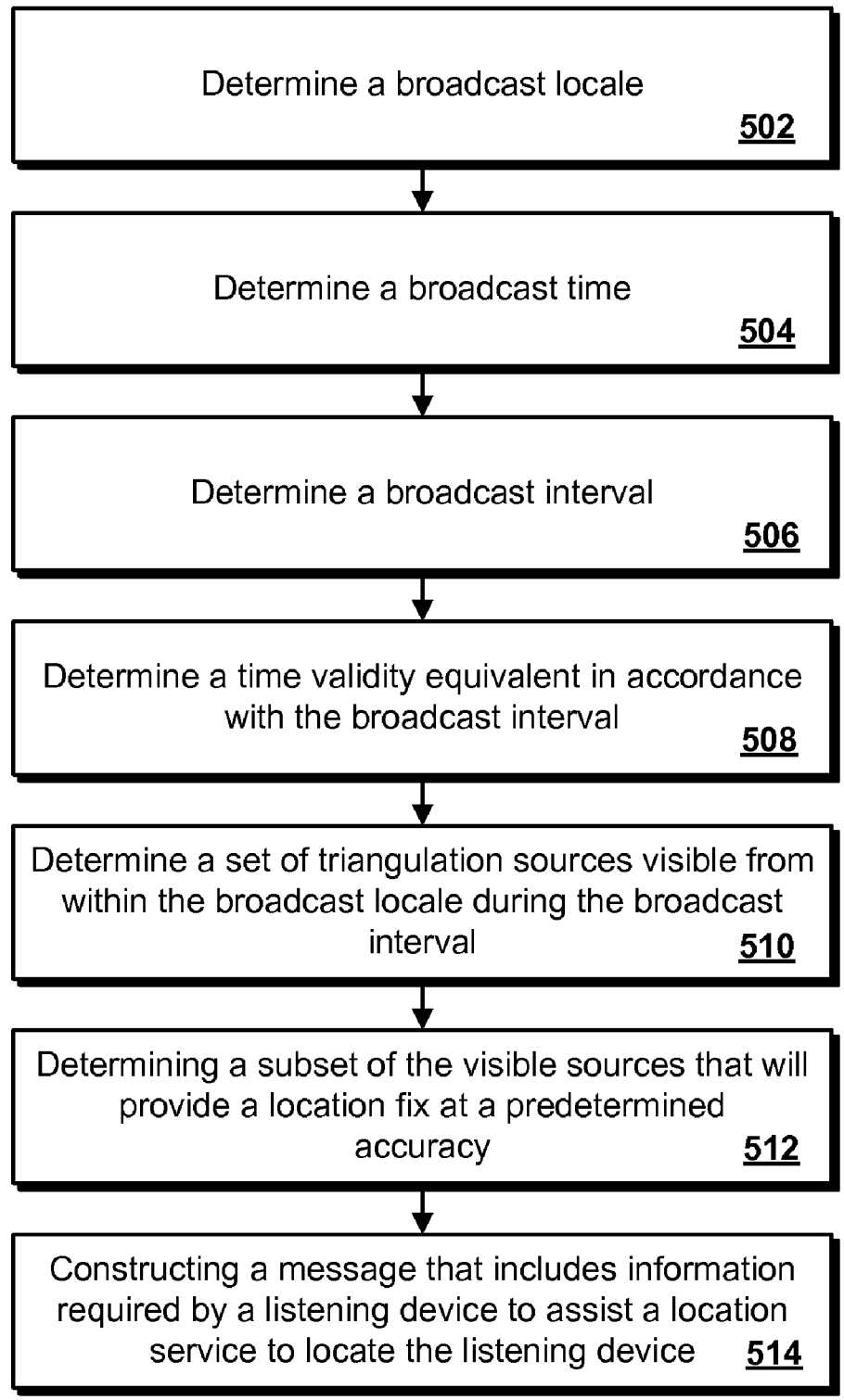
FIG. 5 is a flow diagram showing an alternate process for constructing a message that includes information required by a GPS assisted device to locate the device.

FIG. 5 is a flow diagram showing an alternate process for constructing a message that includes, for example, GPS information. Similar to FIGS. 3-4, process 500 may be performed, for example, by the GPS network 100, and for clarity of presentation, the description that follows uses the GPS network 100 as the basis of examples for describing the process 500. However, another apparatus, system, or combination of systems, may be used to perform the process 500.

Process 500 beings with determining a broadcast locale (502), a broadcast time (504) and broadcast interval (506). From the broadcast interval, a time validity equivalent may be determined (508). In some implementations, the time validity includes a time window that is less than or equal to four hours.

A set of triangulation sources visible from within the broadcast locale during the broadcast interval (510), and a subset of the visible sources that will provide a location fix at a predetermined accuracy (512) may be determined.

With the set and subset of visible triangulation sources determined, a message may be constructed that includes information required by the requesting device to locate the requesting device (514). In some implementations, the message may be a SMS message. The SMS message may be transmitted in a single transmission. If multiple SMS messages are involved, the message may be transmitted in multiple transmissions.

In some implementations, operations 502-514 may be performed in the order listed, in parallel (e.g., by the same or a different process, substantially or otherwise non-serially), or in reverse order to achieve the same result. In some implementations, operations 502-514 may be performed out of the order shown. For example, a broadcast locale may be determined (502) prior to determining a broadcast time (504). As another example, determining a broadcast interval may be determined (506) prior to determining a broadcast time (504). Also, the order in which the operations are performed may depend, at least in part, on what entity performs the method. Operations 502-514 further may be performed by the same or different entities or systems.

In some implementations, a mobile unit may be configured to use a combination of conventional data (i.e., ephemerides) and assist information described above. For example, at start up, a device may, in parallel, request assist information (e.g., information that is of a predetermined quality to satisfy a location based request) and ephemerides (e.g., from available sources). Until the ephemerides information is received, decoded and able to be used in the device, the assist information can be used to provide location information for the device. After decoding, conventional ephemerides can be used. Other applications are possible. For example, a mobile unit may be on, but have outdated ephemerides. In such an application, assist information as described above can be used in the interim period to provide location information for the device until an update can be procured.

In one specific example, a process is provided in a device that is executing an application that provides a location based request to a location based service associated with the device. The device can be of the form of a mobile unit 200/300 as described above. The process can begin with receipt of a location based service request of a predetermined quality. For example, the predetermined quality can be of a predetermined accuracy level or validity time within a predetermined tolerance. An assist request can be made for assist information of the predetermined quality. The assist information then may be received (e.g., an SMS message including the information may be received).

Substantially contemporaneously or subsequent to the generation of the assist request, an ephemerides request for ephemerides can be made to one or more sources. The ephemerides request can be made as discussed above to one or more visible sources or a subset of visible sources. Until ephemerides are received, decoded and ready for use, the received assist information can be used to locate the device. After decoding, the ephemerides can be used to locate the device. Other examples of this process are possible.

Generic Computer System

Figure 6:
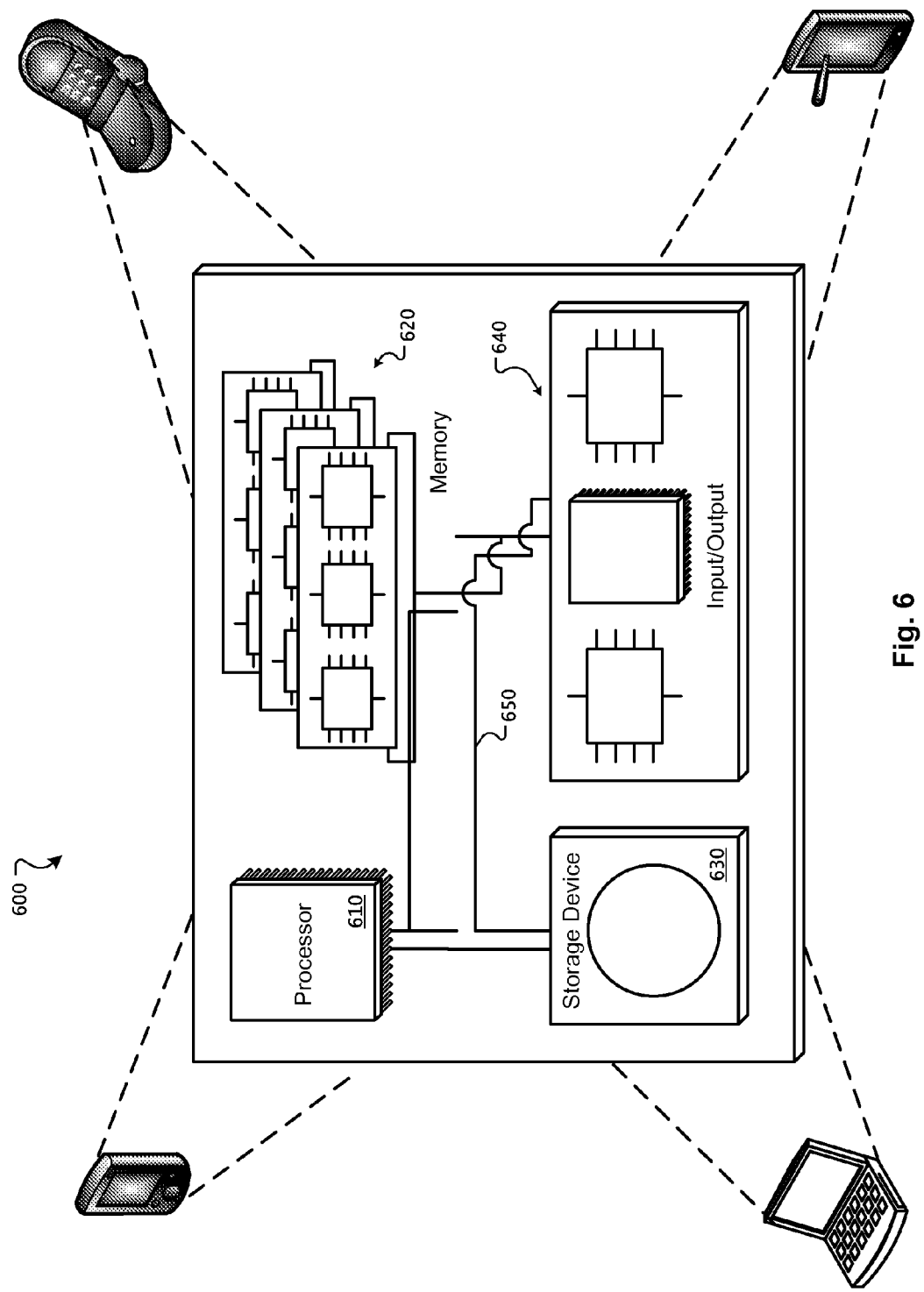
FIG. 6 is a block diagram of generic processing device that may be used as a GPS assisted device.

FIG. 6 is a block diagram of a generic processing device 600 that may be used, for example, as a GPS assisted device. The device 600 may be used for the operations described in association with processes 300, 400 and 500 according to one implementation. The device 600 includes a processor 610, a memory 620, a storage device 630, and an input/output device 640. Each of the components 610, 620, 630, and 640 are interconnected using a bus 650. The processor 610 is capable of processing instructions for execution within the device 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the device 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the device 600. In one implementation, the storage device 630 is a computer-readable medium. In various different implementations, the storage device 630 may be a hard disk device, an optical disk device, or a flash drive. The storage device 630 may be used, for example, to store information associated with various geographic locations.

The input/output device 640 provides input/output operations for the device 600. In one implementation, the input/output device 640 includes a keyboard and/or pointing device. In another implementation, the input/output device 640 includes a display unit for displaying graphical user interfaces.

Embodiments of aspects the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on an information carrier medium for execution by, or to control the operation of, data processing apparatus.

The term "data processing apparatus" encompasses all apparatus, devices, and machines for processing data, including by way of example a programmable processor (also know as a CPU (central processing unit)), a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer-readable medium can be a machine-readable storage device, a machine-readable storage substrate, a memory device, or a combination of one or more of them. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

An information carrier medium can be a propagated signal or a computer-readable medium. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a GPS receiver, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results.

What is claimed is:

1. A method comprising
receiving a request for location services, the request generated by a requesting device and received by a system separate from the requesting device;
determining a locale associated with the requesting device;
determining a set of visible triangulation sources based on the locale;
selecting, by the system, an accuracy level based on the requesting device;
determining, from the set, a subset of the visible triangulation sources that will provide a location fix at the selected accuracy level;
determining a time period associated with the location fix, wherein the location fix is accurate during the time period;
constructing a message that includes information required by the requesting device to locate the requesting device, the message constructed in a format that the requesting device uses to provide the location fix for the time period; and
broadcasting the message at least to the requesting device.

2. The method of claim 1 wherein constructing the message includes constructing an SMS message.

3. The method of claim 1 wherein constructing a message includes determining a subset of parameters associated with each triangulation source to be provided in the message.

4. The method of claim 3 wherein the subset includes less than all available parameters for the triangulation source.

5. The method of claim 3 wherein constructing the message includes providing clock correction along with the subset of parameters.

6. The method of claim 3 wherein constructing the message includes integrating harmonic correction factors in the subset of parameters.

7. The method of claim 1 where the time period is less than 4 hours.

8. The method of claim 1 where the time period is substantially one minute.

9. The method of claim 1 where time period is used to determine the locale.

10. The method of claim 1 where the time period is used to determine the set of visible triangulation sources.

11. The method of claim 1 where the time period is used to determine the subset of visible triangulation sources.

12. A method comprising:
requesting, by request to a system separate from a device, location assist information so as to determine a location of the device;
receiving the location assist information from the system including receiving a broadcast message that includes the location assist information, the system having selected an accuracy level based on the device and determined a validity period based on the selected accuracy level, wherein the location assist information is accurate during the validity period; and
constructing a location datafile including a minimal set of information required to locate the device and associated with those triangulation sources that are visible during a time period associated with a service offered to or provided by the device.

13. The method of claim 12 further comprising:
specifying a time interval requirement for a service using the location assist information, where the time interval requirement is less than that associated with the ephemeris information and specifically less than 4 hours.

14. A method comprising:
receiving a request for location services from a requesting device, the request received by a system separate from the requesting device;
selecting, by the system, an accuracy level based on the requesting device;
determining, by the system and based on the selected accuracy level, a valid time period for use of location data;
constructing a message that includes information required by the requesting device to locate the requesting device within the selected accuracy level, wherein the location data is accurate only during the valid time period, and where the message is constructed in a format that the requesting device uses to provide the location data for the valid time period; and
delivering the message to the requesting device using a broadcast method.

15. A broadcast method comprising:
determining a broadcast locale;
determining a broadcast time;
determining a broadcast interval;
determining a time validity equivalent in accordance with the broadcast interval;
determining a set of triangulation sources visible from within the broadcast locale during the broadcast interval;
selecting an accuracy level based on a listening device;
determining a subset of the visible sources that will provide a location fix at the selected accuracy level, the selected accuracy level having a valid time period, wherein the location fix is accurate during the valid time period; and
constructing a message that includes information required by the listening device to assist a location service to locate the listening device including constructing the message in a format that the requesting device uses to provide the location fix for the valid time period.

16. The method of claim 15 where the location service is a GPS based service.

17. The method of claim 15 wherein constructing a message includes determining a subset of parameters associated with each triangulation source to be provided in the broadcast message.

18. The method of claim 17 wherein the subset includes less than all available parameters for a triangulation source that are associated with the ephemeris information.

19. The method of claim 15 wherein a rough order of broadcast time is known by the listening device and using the rough order of broadcast time to receive and align a broadcast time to GPS Time of Week (TOW) and/or Coordinated Universal Time for input to a GPS associated with the listening device.

20. The method of claim 15 wherein the broadcasted message includes a clock correction along with triangulation source parameter data.

21. The method of claim 15 wherein constructing the message includes integrating harmonic correction factors in triangulation source parameter data.

22. The method of claim 15 wherein the method supports multiple geographically unique broadcast locales.

23. The method of claim 15 wherein the broadcast message is encrypted.

24. The method of claim 23 wherein the broadcast message can be decrypted by a listening device with a valid subscription.

25. A method in a listening device comprising;
   determining a time to listen for a broadcast message including using a clock corrected time to activate listening;
   receiving a broadcast message at the time that includes triangulation source parameter data of a quality and accuracy selected based on a listening device, the selected quality and accuracy being associated with a valid time period; and
   using the broadcast message to assist in a determination of a location of the listening device, where the location is accurate at the selected quality and accuracy during the valid time period.

26. A method comprising:
   requesting location assist information so as to determine a location of a device that is accurate according to an accuracy level during a time period to satisfy a requesting application, the accuracy level selected based on the device;
   receiving the location assist information;
   requesting ephemerides for one or more visible sources; and
   using the location assist information to determine the location of the device until the device has received and decoded the ephemerides.

27. The method of claim 26 where the accuracy of the location degrades outside the time period.

28. The method of claim 26 further comprising using the received and decoded empherides after decoding.

29. The method of claim 26 where receiving the location assist information includes receiving an SMS message including the location assist information.

\* \* \* \* \*

UNITED STATES PATENT AND TRADEMARK OFFICE
CERTIFICATE OF CORRECTION

PATENT NO. : 8,396,484 B2
APPLICATION NO. : 12/192975
DATED : March 12, 2013
INVENTOR(S) : Roderick Michael Johnson et al.

It is certified that error appears in the above-identified patent and that said Letters Patent is hereby corrected as shown below:

Title page, item [57] column 2, Line 6 (Abstract), delete "empherides" and insert -- ephemerides --, therefor.

Title page, item [57] column 2, Line 10 (Abstract), delete "empherides" and insert -- ephemerides --, therefor.

In the Specification

Column 1, Line 12, after "No." insert -- 61/027,358 --.

In the Claims

Column 26, Line 8 (Claim 13), delete "information ," and insert -- information, --, therefor.

Column 27, Line 8 (Claim 25), delete "comprising;" and insert -- comprising: --, therefor.

Column 28, Line 16 (Claim 28), delete "empherides" and insert -- ephemerides --, therefor.

Signed and Sealed this
Thirtieth Day of July, 2013

Teresa Stanek Rea
*Acting Director of the United States Patent and Trademark Office*